United States Patent [19]

Pengilly

[11] 3,885,446
[45] May 27, 1975

[54] GEARING-TORQUE DIVISION

[76] Inventor: Eric Alexander Pengilly, Hawkesbury House, Woolton Hill, near Newbury, England

[22] Filed: Apr. 27, 1973

[21] Appl. No.: 354,955

[30] Foreign Application Priority Data

Apr. 29, 1972 United Kingdom............... 20002/72

[52] U.S. Cl. ...................... 74/331; 74/359; 74/333; 74/745; 74/410; 74/361; 74/355
[51] Int. Cl........................... F16h 3/08; F16h 57/02
[58] Field of Search ............. 74/359, 360, 331, 363, 74/333, 745

[56] References Cited
UNITED STATES PATENTS

| | | | |
|---|---|---|---|
| 3,046,807 | 7/1962 | Barth et al. ...................... | 74/359 X |
| 3,105,395 | 10/1963 | Perkins ................................ | 74/331 |
| 3,237,472 | 3/1966 | Perkins et al. ...................... | 74/331 |
| 3,335,616 | 8/1967 | Perkins .............................. | 74/331 |
| 3,425,290 | 2/1969 | Perkins .............................. | 74/331 |
| 3,500,695 | 3/1970 | Keiser .............................. | 74/359 X |
| 3,611,823 | 10/1971 | Richards ............................ | 74/331 |

Primary Examiner—Samuel Scott
Assistant Examiner—P. S. Lall
Attorney, Agent, or Firm—Oblon, Fisher, Spivak, McClelland & Maier

[57] ABSTRACT

A transmission comprising a drive shaft for driving a main section of the transmission, a driven shaft driven by the main section so as to drive in turn a range section, and an output shaft driven by the range section. Each section has a pair of intermediate shafts, the plane containing the axes of one pair being angularly offset from the plane containing the axes of the other. Each intermediate shaft carries a helical gear meshed with a common helical gear on the section input shaft. The main section includes a series of gear assemblies providing different gear ratios, each assembly comprising a helical gear on the driven shaft meshed with a respective pair of helical gears carried by respective intermediate shafts. In the range section each intermediate shaft carries a double helical gear, each double helical gear being meshed with single helical gears on the output shaft. The helical gears on the output shaft and the drive shaft are each mounted so as to permit pivoting about an axis normal to the shaft axis to enable balancing of axial components of reaction forces, and thus transmission of torque via all intermediate shafts simultaneously. Each of the plurality of gear assemblies in the main section is individually adjusted so that simultaneous contact of the driven shaft gear with its intermediate shaft gears is achieved when the main section pivotal gear is in a predetermined disposition. The angles of inclination of the teeth of the gear assemblies are different to facilitate transmission of torque via both intermediate shaft if the transmission should go into overrun. Each intermediate shaft of the main section extends through to the range section, and carries a helical idler gear meshed with the helical gear at the input end of the adjacent range section intermediate shaft. The idler gears can be clutched to their respective main section intermediate shaft to permit reverse rotation of the output shaft for unidirectional rotation of the drive shaft.

19 Claims, 8 Drawing Figures

GEARING-TORQUE DIVISION

INTRODUCTION

The present invention relates to transmissions.

The design of gearboxes for heavy goods vehicles is continually subject to demand for transmission of more power. The conventional gearbox transmits power between main shafts by way of a single intermediate shaft. In order to transmit more power with this design, it is necessary to increase the center distances between the main shafts and the intermediate shaft, thus necessitating the use of a larger casing which takes up more space in the overall vehicle design, and larger gears. Increased center distance also involves increased load on the bearings, so that bearing design may become the limiting problem in the gearbox design. Further, with larger gears, the pitch line speed will increase because the input shaft will rotate at a substantially constant speed. Increased pitch line speed carries with it increased noise in operation, and this noise is at present becoming a serious problem in gearbox design.

PRIOR ART

A solution is the use of a plurality of intermediate shafts spaced around the main shaft. If the load torque is equally shared between these intermediate shafts there is no necessity to increase the gear sizes, or gear sizes could be reduced. However, this ideal solution is not readily obtainable in practice, because it is impossible to manufacture the parts of the transmission, and to assemble them with sufficient accuracy to ensure that full load torque is satisfactorily shared between the two intermediate shafts. In practice, it is found that a gear on one or other of the shafts will engage first with the corresponding main shaft gear, and substantially the full load will be transmitted via the engaged gear and its corresponding shaft.

This problem arises because of a multitude of factors which affect the relationship of the parts within the assembly, for example base pitch errors, the location of the teeth of each gear relative to the key way on the associated shaft, the mounting of each shaft in its bearings, and many other factors. As indicated above, it is not a practical proposition to control all these factors in the assembly stage.

Several different attempts at solutions to this problem have been made. One such attempt (see for example U.S. Pat. Nos. 3,425,290; 3,335,616; 3,105,395 and 3,237,472) has been in connection with gear trains employing spur gears. This arrangement involves the provision of a degree of radial freedom for a main shaft or a main shaft gear. Thus, if only one intermediate shaft is transmitting torque, the radial load on the "free" shaft or gear will move that element towards the other intermediate shaft to an extent sufficient to force that shaft to transmit torque so as to balance the radial loads on the "free" element. However, this freedom contributes to, rather than mitigates, the noise problem.

Alternative proposals for gear trains transmitting very high power for example in marine engines, have employed helical gears developing axially directed reaction components in the intermediate shafts. The intermediate shafts have been extended through the gearbox casing to co-operate with a balancing coupling outside the gearbox. The coupling, which may comprise a pivoted lever or a complex hydraulic circuit, is arranged to cause axial movement of an intermediate shaft which is not transmitting load so as to force a helical gear carried by that shaft into loadtransmitting contact with a main-shaft gear, thereby to balance axially directed reaction forces in the intermediate shafts. However, these proposals each involve additional equipment outside the gearbox casing adding to space requirements and expense of the gearbox as a whole, and they also involve freedom of each intermediate shaft in its bearings.

SUMMARY OF THE INVENTION

According to the present invention, there is provided a transmission comprising first and second rotatable members, a first helical gear rotatable with said first member, a plurality of further helical gears meshed with said first gear and coupled with said second member, and mounting means for said first gear arranged to permit it to pivot under the action of axially directed components of reaction forces arising from said further gears under load so that torque can be transmitted between the members in each of said further helical gears.

The coupling means may comprise a plurality of gear assemblies providing different gear ratios, each assembly comprising a plurality of gears fixed for rotation with respective ones of said further gears and an associated gear, there being clutching means for selectively clutching the associated gears with the second member. However, a problem may arise if an unclutched assembly "binds" before each of the plurality of gears in a clutched assembly has achieved contact with the associated gear. The transmission can be assembled so as to avoid this problem if torque is transmitted always from one particular member to the other, but additional means may be required if either member can act as the driving member.

According to a second aspect of the invention, therefore, there is provided a transmission comprising first and second members, a plurality of gear assemblies providing different ratios, each assembly comprising a plurality of gears each coupled with one of said members and an associated gear meshed with each of the plurality of gears in its assembly, and clutch means for selectively clutching said associated gears to the other of said members, each of said gear assemblies comprising helical gears and the helix angles of the teeth of said gear assemblies being different so that for any of said assemblies, when its associated gear is clutched to said other member, torque can be transmitted via each of the plurality of gears both from said first member to said second member and from said second member to said first member, the larger the meshing radius of the gears of the plurality, the larger the helix angle of the teeth of these gears.

A third aspect of the invention is directed to an arrangement of a transmission to provide a reversible drive from a source of unidirectional, rotational drive, particularly when the transmission has a main section and a "range" section for obtaining an increased number of possible speed changes.

A conventional transmission for providing reversible drive employs a reverse gear assembly additional to those provided to obtain forward speeds. This reverse assembly includes a reverse idler mounted on an additional shaft (see for example U.S. Pat. No. 3,335,616 referred to above).

According to the third aspect of the present invention, there is provided a transmission for obtaining reversible drive from a source of unidirectional, rotational drive comprising an input member for connection with said source, an output member to be reversibly driven, an output member driving gear for driving said output member, first and second couplings between said gear and said input member arranged to drive said gear in opposite directions and clutch means for selecting which of said couplings is effective to drive the gear.

The first coupling may comprise a first gear rotatable by said input member, a second gear meshed with the first and a third gear meshed with said driving gear, the second coupling comprising said first gear and a fourth gear meshed with the driving gear, said clutch means being arranged to select which of said third and fourth gears is rotatable by said first gear to drive said driving gear.

BRIEF DESCRIPTION OF THE DRAWINGS

By way of example, some embodiments of the invention will now be described with reference to the accompanying drawings, in which.

DESCRIPTION OF THE PREFERRED EMBODIMENTS

Figure 1:
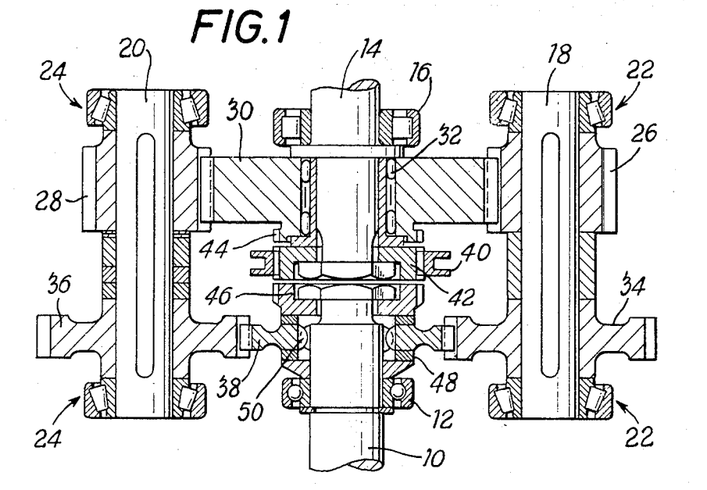
FIG. 1 is a diagramatic, sectioned plan view of a simple transmission embodying the principles of the invention.

In FIG. 1, reference numeral 10 indicates an input shaft mounted in bearings 12 so as to be co-axial with an output shaft 14 mounted in bearings 16. As will be described below, torque can be transmitted from input shaft 10 to output shaft 14 either by way of a direct coupling between those shafts, or by way of a pair of intermediate shafts 18, 20 mounted in respective bearing sets 22, 24. All the shafts are axially and radially constrained.

To enable transmission of torque by way of the intermediate shafts, the transmission comprises two gear assemblies. One gear assembly comprises involute, helical gears 26, 28 on respective intermediate shafts 18, 20 and conjugate gear 30 which is mounted on output shaft 14 by means of bearings 32 permitting free rotation of the gear relative to the shaft. The second gear assembly comprises involute, helical gears 34, 36 on respective intermediate shafts 18, 20 and conjugate gear 38 which is internally meshed with input shaft 10 in a manner to be described in further detail below.

Each gear is in constant mesh with the associated gear(s) in its assembly. Thus, intermediate shafts 18, 20 are always rotated by the second gear assembly in use. However, torque can only be transmitted from shafts 18, 20 to output shaft 14 by way of internally splined clutch ring 40. This ring is mounted so as to permit axial sliding motion on an externally splined member 42 which is rotatable with shaft 14. Ring 40 can thus be axially moved into mesh with splines 44 on gear 30. Direct coupling of shaft 10 to shaft 14 can be effected by axial sliding of ring 40 into mesh with externally splined portion 46 mounted for rotation with shaft 10. Clutches employing sliding rings similar to ring 40 are well known in the art, and accordingly it is thought unnecessary to provide further detail of this arrangement, or the means for effecting axial sliding of the clutch ring.

Consider now the situation in which torque is being transmitted from shaft 10 to shaft 14 via the intermediate shafts 18 and 20. At each region of mesh within each gear assembly, the forces on the gears will act in a direction substantially normal to the areas of contact between the gears. Since all the gears are helical, each of these forces has a component in a direction parallel to the central axis of the transmission. Gear 38 is therefore subjected to such axial components on either side of the central axis of the transmission. If these axial components are not substantially equal that is, if the shafts 18 and 20 are not carrying substantially equal loads, there will be a turning moment applied to gear 38, tending to rotate it about an axis substantially normal to the plane of FIG. 1 and passing through the central axis of the transmission. In order to permit substantial equalization of these forces, and thereby substantial equalization of the loads carried by shafts 18 and 20, gear 38 is mounted on shaft 10, in a manner described in detail below, such as to permit the gear to pivot about the above-mentioned axis normal to the plane of the figure.

Consider the situation in which gear 30 is clutched to shaft 14, the latter is clutched to a load and drive torque is applied to shaft 10. Assume that gear 38 first engages gear 34, there being a clearance between gear 38 and gear 36. Shaft 18 rotates to bring gear 26 into engagement with gear 30, thereby tending to rotate shaft 14, and as a result a corresponding axially directed reaction force is developed on the right hand side of gear 38 as viewed in FIG. 1. Since there is no balancing force developed on the left hand side of this gear, it pivots until gear 38 is brought into contact with gear 36. Shaft 20 and shaft 14 will now begin to rotate, and if gear 28 is engaged with gear 30, then the load will be shared between the two shafts, the axially directed reaction components on gear 38 will balance, and the gear will cease pivoting.

If gear 28 is not in engagement with gear 30 when gear 38 engages gear 36, then shaft 20 will start to rotate before shaft 14. There will still be no axially directed components on the left hand side of gear 38 because shaft 20 has not yet taken up any load. Gear 38 will therefore continue to pivot anti-clockwise, its teeth sliding over the teeth of gear 36 to cause the rotation of that shaft. When gear 28 comes into engagement with gear 30, the pivoting and sliding cease as shaft 20 takes up its share of the load and the axially directed components on gear 38 come into balance.

As rotation of the various shafts continues, errors in the formation of the individual gears or their associated shafts, or in the mounting of the various parts of the asembly, may tend to again throw the load onto one or other of the intermediate shafts. Any such tendency will be accompanied by imbalance in the axial reaction components on gear 38, causing pivoting of that gear in a direction appropriate to restore load sharing between the intermediate shafts in the manner described above.

The mounting of gear 38 is designed to restrain the gear against axial bodily movement under the axial components referred to above, while permitting limited pivoting movement. Two features of the illustrated mounting are important in this connection, namely
i. axial location of the gear by clamping it between annular blocks 48 of compressible, elastomeric material, and
ii. special formation of the external teeth on shaft 10 as indicated at 50.

This formation can be achieved by "barrelling" the teeth, or by crown-shaving them. Neither of these features is essential to a satisfactory gear mounting, but the use of elastomeric blocks is particularly advantageous, in that, besides achieving the axial location with limited pivotal freedom requirement, it also serves to cushion the transmission against shock loads and to reduce noise.

Gears 26, 28 and 32 could be spur gears. However, helical gears are preferred because they have more satisfactory operational characteristics than spur gears, particularly with regard to noise and surface stress fatigue capacity.

It should be noted that the pivoting movements made by gear 38 are minute — they are required only to take up the minute errors which occur in manufacture and assembly of the gearbox. Nevertheless, it is desirable to reduce, where possible, the angle through which gear 38 is required to pivot. Aside from accuracy of manufacture and assembly of the parts of the transmission, one way of reducing the angle of pivot required of gear 38 is to arrange the transmission so that each intermediate shaft would carry the load for at least part of one full rotation of gear 30, even if gear 38 were not capable of driving the gears of the first assembly into continuous simultaneous contact. If this can be arranged, gear 38 will be required to pivot both clockwise and anti-clockwise, as viewed in FIG. 1, in the course of one rotation of gear 30, but the extent of pivoting in either direction will be less than if pivoting were required in only one direction.

In order to achieve this, it is necessary to arrange the transmission so that at least one point in each rotation of gear 30, all the gears are in simultaneous contact even without pivoting of gear 38. Preferably, the arrangement is such that simultaneous contact is achieved at some "mean" point, so that gear 38 pivots through approximately equal angles in each direction from its orientation at this mean point.

Consider now the transmission shown in FIG. 1 immediately after first assembly. Assume a holding torque is applied to shaft 14, and a drive torque is applied to shaft 10, the value of this drive torque being insufficient to cause pivoting of the gear 38 against the resistance of the elastomeric blocks. Assume further that contact is first established in the gears on shaft 18, there being clearance between the intercalated teeth of gears 38, 36 and gears 28, 30. Then shaft 20 will be free to rotate between limits determined respectively by contact between gears 38, 36 and contact between gears 28, 30. This angular play can be measured. It will vary with the angular orientation of each shaft in the assembly, and a number of measurements can be taken at various orientations. The gears can be initially assembled so that play is always found in shaft 20 whatever the angular orientations of the various shafts.

Now, if an "average" play for a number of angular orientations is established, this angular play can, by reference to the lead of gear 28, be converted into an axial adjustment of that gear required to take up the average play. This is a property of helical gears, and provides the advantage that even after the gears have been formed, they can be adjusted by simple axial movement into a required contact relationship. The axial adjustment can be achieved by shifting gear 28 along its shaft and re-locating it with a specially formed setting shim. Alternatively, the gear can be intially located by a special setting collar, which can be removed and replaced by a specially formed locating collar after adjustment of the gear.

The effect of the elimination of the "average" play referred to above is to achieve the required mean simultaneous contact, so that, thereafter, in the absence of pivoting gear 38, load would be transferred from one intermediate shaft to the other at about the mean point.

Figure 2A:
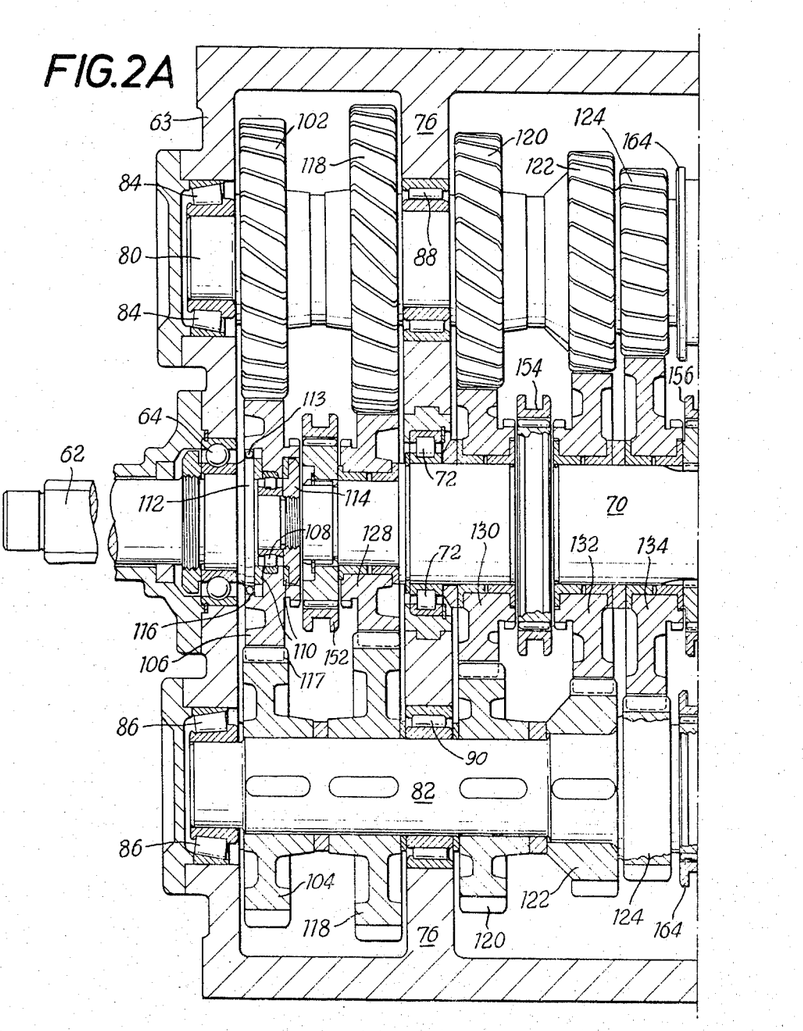
FIGS. 2A and 2B are sectioned views of a more complex transmission embodying the principles of the invention.
Figure 2B:
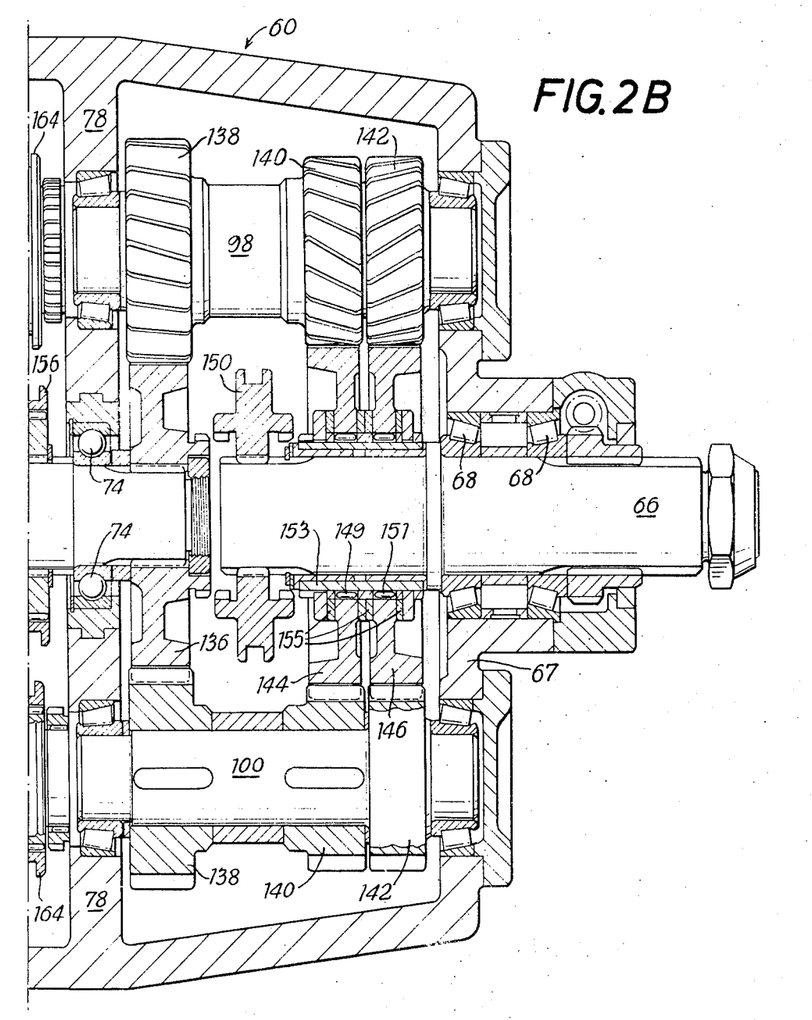
Figure 3:
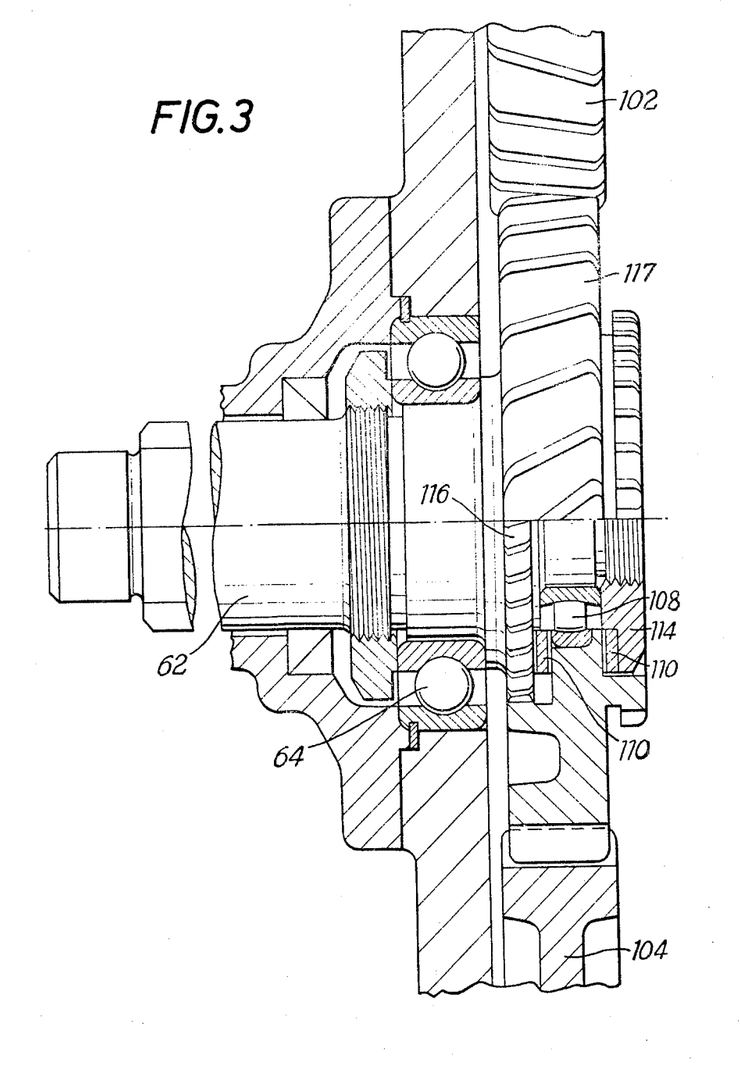
FIG. 3 is a detail taken from FIG. 2 and drawn to a larger scale.

FIGS. 2 and 3 show a more complex transmission housed within a casing 60. The transmission comprises an input shaft 62 which is mounted in one end wall 63 of casing 60 by means of ball bearings 64. The transmission also comprises an output shaft 66 mounted in the other end wall 67 of casing 60 by means of conical roller bearings 68. Within the casing 60 a further shaft 70 is mounted co-axial with input shaft 62 and output shaft 66 by means of bearings 72, 74 in internal walls 76, 78 of the casing. Wall 78 divides the interior of the casing into a "main" section of the transmission to the left of the wall 78 as viewed in FIG. 2, and a "range" section to the right of the wall 78 as viewed in FIG. 2.

Figure 4:
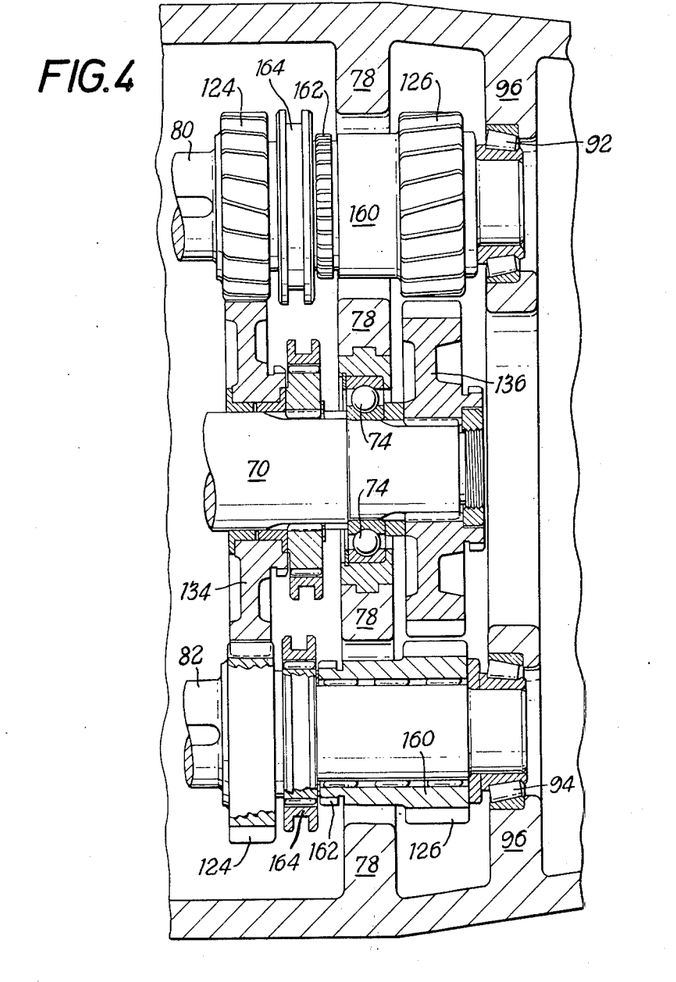
FIG. 4 is a view similar to FIG. 2 of a portion of the transmission, the section being taken on a plane angularly offset from the plane of the section in FIG. 2.

A pair of intermediate shafts 80, 82 are mounted in respective bearings 84, 86 in the end wall 63 of the casing, and in respective bearings 88, 90 in interior wall 76. As best seen in FIG. 4, these intermediate shafts extend through openings in interior wall 78 and are mounted at their ends in respective bearings 92, 94 in a further interior wall 96 within the range section of the transmission. Intermediate shafts 80, 82 extend parallel to, and are equiangularly spaced around, shaft 70.

Within the range section of the transmission, a pair of intermediate shafts 98, 100 extend between the interior wall 78, and the end wall 67 of the casing, being mounted in respective bearings in each of those walls. Shafts 98, 100 extend parallel to, and are equiangularly spaced around the inwardly projecting end of shaft 66. The axes of shafts 98, 100 are, however, angularly offset from the axes of shafts 80, 82.

Shafts 80, 82 carry respective single, involute, helical gears 102, 104 which mesh with a single, involute, helical gear 106 mounted on input shaft 62. The mounting for gear 106 comprises a part spherical bearing 108, and a pair of elastomeric rings 110 engaging respective annular faces on the gear. The rings and the gear are clamped between a shoulder 112 on the input shaft 62 and a nut 114 co-operating with an externally threaded portion on the end of the shaft. Shoulder 112 has external helical teeth 113 to co-operate with internal teeth 116 on the gear 106, so that the gear is driven by the input shaft 62. These teeth are crown shaved so that they, the bearing 108 and the elastomeric rings 110 provide freedom for pivoting of the gear 106 to permit substantial equalisation of load between shafts 80, 82.

The lead of teeth 116 is made equal to the lead of the teeth 117 on gear 106. Thus, the loading of the rings 110 will be minimized because the axial components on teeth 116 will be substantially balanced by the axial components produced on teeth 117.

Within the main section of the transmission, shafts 80, 82 each carry four gears 118, 120, 122 and 124. These provide four forward speeds derivable from the transmission, a fifth forward speed being obtained by direct coupling of input shaft 62 to shaft 70 as described below. Within the range section of the transmission, shafts 80, 82 each carry a gear 126 which is used, in a manner to be described below, to give reverse operation of the transmission. Within the main section of the transmission, shaft 70 carries gears 128, 130, 132 and 134 meshed respectively with gears 118, 120, 122 and 124.

Consider first forward operation of the gear box, ignoring for the moment the range gears to the right of the wall 78. Assume, therefore, that shaft 70 is coupled directly to output shaft 66 by means of the clutch ring 150, which would be moved to the left from the position shown in FIG. 2 to enable this connection. Now, the input shaft 62 can be coupled directly with the shaft 70 by means of the clutch ring 152, which would be moved to the left relative to the position shown in FIG. 2. This would give a connection straight through the transmission. Since gear 106 is permanently meshed with the input shaft, and with gears 102, 104, both of the intermediate shafts 80, 82 would be rotated, but neither would transmit load because each of gears 128, 130, 132 and 134 is free to rotate on shaft 70.

If it is now desired to drive shaft 70 via the intermediate shafts, clutch ring 152 is moved clear of input shaft 62, and either that clutch ring is moved into mesh with gear 128, or clutch ring 154 is moved into mesh with either gear 130 or gear 132, or clutch ring 156 is moved into mesh with gear 134. Meshing of one of these clutch rings with one of the gears on shaft 70 applies the load to at least one of the shafts 80, 82 thus resulting in production of axial reaction forces on the gear 106, which forces, if unbalanced, will cause pivoting of that gear about an axis normal to the plane of FIG. 2 and passing through the center of the spherical bearing. Thus, load will be substantially equally shared between shafts 80, 82 as described above with reference to FIG. 1.

The range section of the transmission enables further variation of the output speeds obtainable from the transmission. When the range section is in use, clutch ring 150 would be moved out of engagement with shaft 70. That shaft is provided within the range section with a gear 136 meshed with gears 138 on respective shafts 98, 100. The latter shafts also each carry a double helical gear comprising portions 140, 142 carrying oppositely directed helical teeth. Portions 140, 142 are meshed respectively with single helical gears 144, 146 on the inwardly projecting portion of output shaft 66. Gears 144, 146 are internally splined to co-operate with respective externally splined portions 149, 151 on a sleeve 153 which is journaled on the shaft 66. Gears 144, 146 are clamped between elastomeric rings 155 similar to the elastomeric rings 110. The rings are themselves clamped between outwardly extending flanges on the sleeve 153, the flange adjacent clutch rings 150 being splined to co-operate with that clutch ring.

To understand operation of the range section of the transmission, it is sufficient to consider the shaft 70 as the "input" shaft to that section. Drive to the shaft 70 may have been derived from any of the above described modes of operation of the main section of the transmission. Since gear 136 is permanently meshed with gears 138, shafts 98, 100 will be rotated even when clutch ring 150 is engaged with shaft 70. However, this will merely cause sleeve 153 to rotate on shaft 66, since there will then be no coupling between the sleeve and the output shaft. However, if clutch ring 150 is moved to the right to couple with the splines on sleeve 153, then load will be applied to at least one of the intermediate shafts 98, 100 and then will be substantially equally shared between them because of the mounting of the output gears 144, 146 on the shaft 66.

Since gears 144, 146 are helical, each is subjected to axial reaction forces in the same way as input gear 106. Each is mounted so as to give it limited freedom to pivot about a respective axis normal to the plane of FIG. 2. It is to be expected that, in use, contact will first occur between one portion of one double helical gear, and the corresponding output shaft gear, for example between the gear portion 140 in the lower half of FIG. 3, and the gear 144. This will create a reaction force tending to push gear 144 to the right relative to the shaft 66, and to pivot it in an anti-clockwise direction about the above mentioned axis. These reaction forces will be transferred through the intervening elastomeric rings 155 to the gear 146, and the rightward movement of gear 144 will continue until gear 146 is forced into contact with one or both of gear portions 142. When this happens, further reaction forces will be set up to create compression of the elastomeric rings 155 so that each gear 144, 146 attains a zone of contact with each of its corresponding gear portions 140, 142. The double helical gear assists in reducing stress on the teeth of the output gears, while reducing axial forces on the bearings holding shafts 98, 100.

The reverse mode of operation will now be described. As mentioned above, this involves use of the gears 126, each of which is provided on a sleeve 160 (FIG. 4) which projects through the associated opening in the wall 78. Sleeve 160 is mounted on its associated shaft 80 or 82 by way of needle roller bearings. The end of each sleeve 160 within the main section of the transmission is externally splined at 162 to co-operate with a respective clutch ring 164 by which the sleeve can be clutched to the associated shaft 80 or 82. It will be noted from FIG. 4 that the external diameters of gears 126, 136 are such that they are not meshed. However, each gear 126 is meshed with its adjacent gear 138 on respective shafts 98, 100.

When reverse gear is not in use, clutch rings $_2$ 164 adopt the position shown in FIG. 4, so that sleeves 160 rotate freely on their respective shafts 80, 82. When reverse gear is engaged, clutch ring 152 is moved to the left so that input shaft 62 is clutched to gear 106, and load is transmitted via the shafts 80, 82 which rotate in the same direction as in forward drive. However, clutch rings 164 are moved to the right so as to drive sleeves 160 and gears 126. The latter gears drive gears 138 and thus shafts 98, 100, and gears 144, 146. Clutch ring 150 is moved to the right to mesh with sleeves 153, thereby to drive shaft 66. Reversal is achieved by the inclusion of additional gears 126 in the train. Due to permanent meshing of gears 136, 138, shaft 70 is rotated, but is free to do so since it is not clutched to any of the gears 118, 120, 122 and 124. It will be apparent that since both input gear 106 and output gears 144, 146 are used in the reverse mode, load sharing on shafts 80, 82 and on shafts 98, 100 is achieved in this mode also.

As is the case of the simple transmission shown in FIG. 1, it is desirable to reduce, where possible, the angle through which the pivotal gear is required to pivot in use. As before, this can be done by achieving mean simultaneous contact, but in this case it must be achieved independently for each gear assembly. Accordingly, each gear 128, 130, 132, 134 is clutched to a holding torque in turn, and for each a drive torque in applied and a number of free play measurements obtained. Suitable locating collars are then used, as before, to ensure that for each gear assembly the gears are in the appropriate relationship.

In order to enable assembly of this transmission, it is necessary to ensure that the intermediate shaft gears are appropriately located axially on their respective shafts before the latter are mounted in the casing. To achieve this, it is desirable to control closely the axial dimension of each gear on an intermediate shaft. A convenient means of achieving such control will now be described with reference to FIG. 5.

Figure 5:
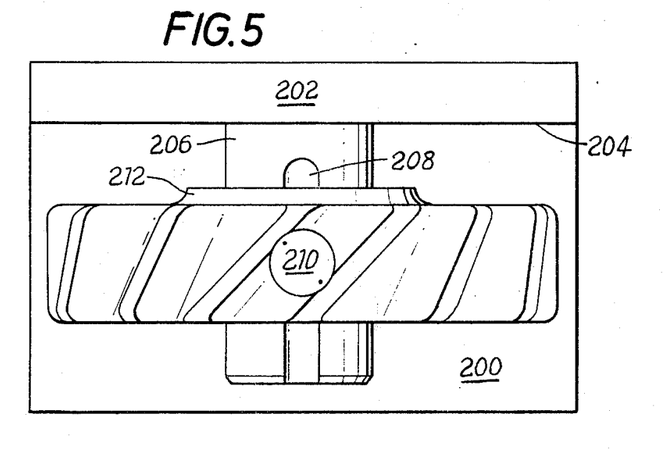
FIG. 5 is a plan view of a simple jig for use in assembly of the transmission shown in FIGS. 2 to 4, and FIGS. 6A and 6B are diagrams for use in explanation of the construction of the transmission shown in FIGS. 2 to 4.

FIG. 5 shows a typical involute helical gear to be assembled on an intermediate shaft. It is mounted in a jig comprising a base plate 200, an upstanding wall 202 having an accurately formed surface 204. From surface 204 there projects a stub shaft 206 formed with a key way 208 similar to the intermediate shaft on which the gear is mounted in use. A sphere 210 is arranged such that one of its axes is accurately aligned with the center line of key way 208 at a predetermined distance from surface 204. The sphere is vertically movable towards and away from the key way. While the sphere is moved away from the key way, the gear is mounted on the stub shaft, and the sphere is then moved back towards the key way to engage two teeth of the gear as shown in FIG. 5. Because of the geometry of the gear and the sphere, the abovementioned axis of the sphere is accurately aligned with a central axial plane of the gear, which is thereby accurately spaced from surface 204.

As seen in FIG. 5, the gear is formed with an axially projecting boss 212. During the manufacturing procedure, this boss is deliberately formed over-size in the axial dimension so as to allow the possibility of finish machining of the free axial surface of the boss to desired spacing from the abovementioned central axial plane of the gear. The required amount of machining to achieve the required spacing can be determined by measurement of the clearance between the axial face of the boss and the surface 204.

Figure 6A:
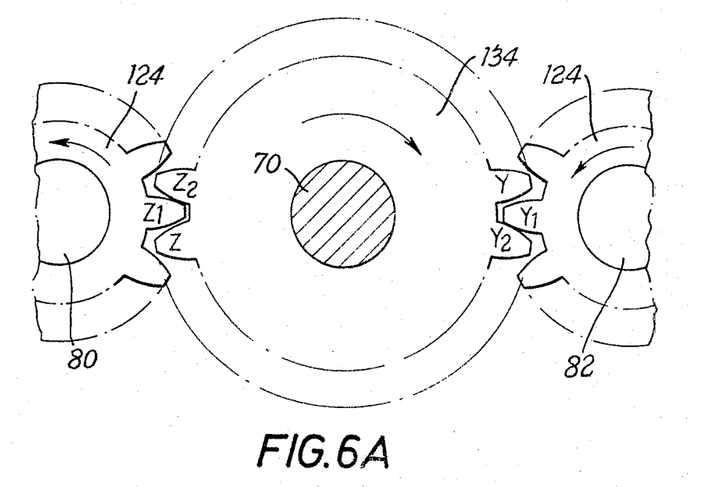
Figure 6B:
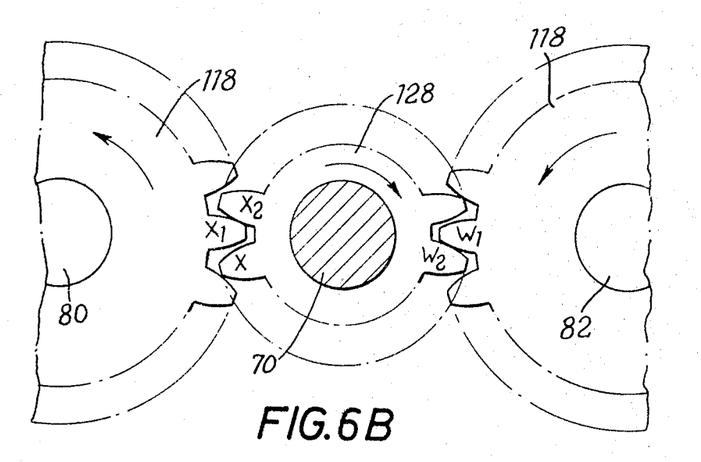

The transmission shown in FIGS. 2–4 includes a further feature to ensure sharing of torque between the intermediate shafts 80, 82 on overrun. Consider the assemblies shown diagrammatically in FIGS. 6A and 6B. FIG. 6A shows the assembly including gear 134, the largest diameter gear on shaft 70. FIG. 6B shows the assembly including gear 128, the smallest diameter gear on shaft 70. The arrow shows the direction of rotation of the gears in all modes of operation.

Assume that gear 134 is clutched to shaft 70. Then FIG. 6A shows the gears in the normal driving condition, with simultaneous contact achieved at $y_1-y_2$ and $z_1-z_2$, that is, with both shafts 80, 82 driving gear 134 and shaft 70. Gears 118 (FIG. 6B) will also rotate gear 128 which is free relative to shaft 70. These gears have been illustrated with simultaneous contact at $w_1-w_2$ and $x_1-x_2$. They will not necessarily be in this condition, since they are not subject to the balacing effect of the pivotal gear, but the condition shown in FIG. 6B will be achieved periodically during rotation of shafts 80, 82 because the initial adjustment procedure has ensured it as described above.

Assume now that the transmission goes into overrun, that is, shaft 70 becomes the driving shaft. Then teeth $y$ and $z$ will close on teeth $y_1$ and $z_1$ respectively, but due to inevitable errors of the type discussed above, contact will be made on one side of gear 134 first, say at $z-z_1$. Therefore, shaft 80 must rotate independently of shaft 82 through an angle given, in radians, by $dmt/r$, where $dmt$ is the difference between the transverse tooth clearances, i.e. clearances in the plane of rotation, $y-y_1$ and $z-z_1$ and $r$ (FIG. 6A) is the meshing radius of gears 124.

During this independent rotation of intermediate shaft 80, the shaft 80 carries with it the whole series of gears it carries, including gear 118 shown on the left of FIG. 6B. But, the meshing radius of gear 118 is $r_3$ (which may be about 2½ times $r$) and a point on this meshing radius will move through an arc of length $r_3/r$ times the arc movement of a point on meshing radius of gear 124. The required independent rotation of shaft 80 is only possible if sufficient transverse clearance exists at $x-x_1$, since if contact is established there before contact is established at $z-z_1$, then a clearance will remain at $z-z_1$ and torque cannot be shared between the two intermediate shafts on the overrun.

The maximum actual difference between transverse clearances at $y-y_1$ and $z-z_1$ will depend on the tooth thickness tolerances of the gears, and on center distance tolerances. However, as explained more fully below, the maximum effective difference in transverse clearances will equal the tooth thickness tolerances on the intermediate shaft gears, since differences in the respective center distances apply to all gears on any intermediate shaft, assuming that the shafts are parallel.

Neglecting center distance variations, there are three conditions of the gears shown in FIG. 6A which ought to be considered, namely (1) all gears in maximum metal condition, (2) all gears in minimum metal condition, (3) one gear 124 in maximum metal condition and the other in minimum metal condition. In cases (1) and (2), the transverse tooth clearances will be equal, though they will differ as between the cases. In neither case is there any need for rotation of one shaft independently of the other, and no "binding" problem arises. The "worst cast" is case (3) — but it must be borne in mind that the tooth tolerances on central gear 128 affect transverse tooth clearances at both gears 118. Thus, the maximum difference between the clearances at opposite regions of mesh on gear 128 is equal to the transverse tooth tolerances on gears 118.

Referring now to FIG. 6B, sufficient clearance must be provided at $x-x_1$ to permit said independent rotation of shaft 80. If $r_3$ is 2.5 times $r$, then clearance needed at $x-x_1$ is at least 2½ times the transverse tooth tolerances on gears 124. In addition to this minimum clearance, some allowance must also be made for cyclic and alignment errors to ensure freedom for unclutched gears. The design backlash may be insufficient to permit the required independent roation.

Since helical gears contact normal to helicoidal surfaces, the tooth thickness tolerances are given and measured in the normal plane. In the plane of rotation, however, tooth clearances will depend on chosen values of normal pressure and helix angles. By choosing appropriate normal pressure and helix inclinations — which not only satisfy the prime design requirements so far as surface stress and strength capacity is concerned — the additional transverse clearance necessary to prevent "binding" can be provided. In practice, the appropriate clearance is most conveniently obtained by varying the helix inclinations of the gear teeth along the intermediate shafts.

If, for example, the gears shown in FIG. 6A have normal pressure angle of 16° and design helix angle of 16°, whilst the gears shown in FIG. 6B have normal pressure angle of 16° but helix angle of 45°, and if normal tooth thickness tolerance and required minimum normal backlash are the same for both sets of gears, then sufficient clearance can be provided to prevent "binding" on overrun as follows:

Normal tooth thickness tolerances (Assume) $= +.000''$
$\phantom{Normal tooth thickness tolerances (Assume)} = -.0025''$
Minimum normal backlash (Assume) $= .006''$
Maximum difference of backlash in the plane of rotation:

$$= \frac{.0025}{\cos 16° \times \cos 16°} = \frac{.0025}{.923} = .0027''$$

Required minimum clearance — plane of rotation: $= .0027 \times 2.5 = .0067''$

Actual minimum clearance at $x - x_1$ $= \frac{.006}{\cos 16° \times \cos 45°}$
$= \frac{.006}{.679}$
$= .0088''$ The word "normal" here means normal to the tooth surfaces, and is not to be confused with design backlash, tolerances, etc.

Consideration of the above calculations will show that the greater helix angle is required closer to the input end of the transmission. Thus, the helix angle of the teeth on gears 118 may approach 45°.

The invention is not limited to details of the embodiments described with reference to the drawings. For example, the part spherical bearing 108 (FIGS. 2 and 3) may be omitted. Centering of the gear 106 relative to the input shart 62 can be achieved automatically by its drive connection with teeth 116. Further when the part spherical bearing is provided, the rings 110 could be omitted, but it is preferable to provide these because of the additional advantages which accompany their use, as described with reference to the similar elastomeric blocks in FIG. 1.

It is desirable to form teeth 116 as helical teeth to control the compression forces applied to the rings 110 as described above. However, this is not essential since the gear 106 could be driven by splining it to input shaft 62. Further, the end of shaft 62 could be provided with a bevel gear, co-operating with a similar bevel portion on the gear 106. The teeth of the two bevel gears could be specially formed in a cam-like fashion, to permit the pivoting movement of the gear 106 relative to the shaft 62. The bevel gears may be provided in a "Curvic" (Registered Trade Mark) coupling. Again, gear 106 would preferably be axially restrained by an elastomeric ring to achieve the advantages described above. In any embodiment, each ring is preferably backed by a rigid steel backing member.

The embodiments have been described using involute helicoidal gears. These gears are preferred because of operational characteristics which are well known and understood in the gear design art. However, the same principles are applicable if screw or convolute helicoids are used.

It is not necessary for a transmission in accordance with the invention to achieve equal load sharing between the intermediate shafts in order to obtain substantial advantages. The actual share taken by each intermediate shaft depends upon the effective center of pivot of the pivotal gear. If this is offset from a position centrally located between the intermediate shafts, then the shafts will carry unequal loads. On the other hand, an arrangement in which the center of pivot is offset from a central location between the intermediate shafts can reduce the degree of pivot required if the pivotal gear is required to pivot in only one direction to achieve load sharing.

Any arrangement which ensures that a substantial portion of the total load is carried by each intermediate shaft will in itself provide advantages for the transmission designer. For example, an arrangement in which two-thirds of the total load is carried by one intermediate shaft, and one-third by the other, may be satisfactory. Capacity of gear teeth is characterised by an endurance limit level of stress. If calculated stresses fall below endurance levels, then the design can be considered satisfactory. There is an exponential relationship between stress and expected life, and accordingly any reduction of stress can have a dramatic effect on life expectancy.

I claim:

1. A transmission comprising first and second rotatable members between which torque is to be transmitted, a first helical gear rotatable with said first member, a plurality of further helical gears meshed with said first gear, coupling means for coupling said further gears with said second member, and mounting means for said first gear arranged to permit said first gear to pivot about an axis transverse to the rotational axis of said first gear under the action of axially directed components of reaction forces arising from said further gears under load so that torque can be transmitted between the members through each of said further helical gears.

2. A transmission as claimed in claim 1 wherein the mounting means comprises part spherical bearing surfaces.

3. A transmission as claimed in claim 1 wherein each of said further gears has two portions of opposite helical inclination, the first helical gear also having two corresponding portions meshed with respective portions of each further gear, said mounting means permitting each portion of said first helical gear to pivot so that torque can be transmitted between said first and second members via each portion of each of said further helical gears.

4. A transmission as claimed in claim 1 wherein said first member is an input member.

5. A transmission as claimed in claim 1 wherein said mounting means comprises axial locating means having a degree of resilience such as to permit said pivoting.

6. A transmission as claimed in claim 5 wherein said axial locating means comprises elastomeric rings.

7. A transmission in accordance with claim 1 wherein said coupling means comprises a plurality of gear assemblies providing different ratios, each assembly comprising a plurality of gears fixed for rotation with respective ones of said further gears and an associated gear meshed with each of the plurality of gears in its assembly, and clutch means for selectively clutching said associated gears to said second member.

8. A transmission as claimed in claim 7 wherein each of said gear assemblies comprises helical gears.

9. A transmission as claimed in claim 8 wherein the helix angles of the teeth of said gear assemblies are different to facilitate torque transmission via each of said further helical gears both from said first member to said second member, and from said second member to said first member, the larger the meshing radius of the gears of the plurality, the larger the helix angle of the teeth of those gears.

10. A transmission as claimed in claim 8 wherein each gear assembly is individually adjusted axially such that each of its plurality of gears contacts the associated gear when said first helical gear is in a predetermined disposition.

11. A transmission comprising first and second members between which torque is to be transmitted; a plurality of intermediate shafts coupled with one of said members; a plurality of gear assemblies each comprising a plurality of helical gears fixed respectively on said intermediate shafts and an associated helical gear meshed with each of the intermediate shaft gears in its assembly, said gears of each of said assemblies having different meshing radii from said gears of each of the other of said assemblies to provide different transmission ratios; clutch means for selectively clutching said associated gears to the other of said members; and torque sharing means for causing torque to be transmitted simultaneously through each of the intermediate shaft gears of any assembly whose associated gear is clutched to said other member, the helix angles of the gears of each of said assemblies being larger as are the meshing radii of said intermediate shaft gears thereof so that, the larger said meshing radius, the greater the rotational free play between the associated gear and the intermediate shaft gears, said rotational free play being such that an assembly whose associated gear is not clutched to said other member does not prevent transmission of torque by each intermediate shaft gear of an assembly whose associated gear is clutched to the other member.

12. A transmission for obtaining reversible drive from a source of unidirectional, rotational drive comprising an input member for connection with said source, an output member to be reversibly driven, an output member driving gear for driving said output member, first and second couplings between said gear and said input member arranged to drive said gear in opposite directions and clutch means for selecting which of said couplings is effective to drive the gear.

13. A transmission as claimed in claim 12, wherein said first coupling comprises a first gear rotatable by said input member, a second gear meshed with the first and a third gear meshed with said driving gear, the second coupling comprising a fourth gear meshed with the driving gear, said clutch means being arranged to select which of said third and fourth gears is rotatable by said input member to drive said driving gear.

14. A transmission in accordance with claim 13 and comprising a plurality of gear assemblies and selector means for selecting which of said plurality is to provide said first and second gears, said assemblies providing different gear ratios.

15. A transmission as claimed in claim 12, wherein said driving gear is one of a plurality of driving gears each arranged for driving said output member, there being a corresponding plurality of first couplings individual to said driving gears and each comprising a respective gear rotatable by said input member, a first common gear meshed with each of said respective gears and a second common gear meshed with each of the driving gears, there being also a corresponding plurality of second couplings individual to said driving gears and each comprising a respective further gear meshed with the associated driving gear, said clutch means being arranged to select corresponding couplings for each driving gear and to determine whether the driving gears are driven by the second common gear or the respective further gears, the transmission further comprising means for causing torque to be transmitted via each of said driving gears simultaneously to the output member.

16. A transmission in accordance with claim 15 and comprising a plurality of gear assemblies and selector means for selecting which assembly of said plurality is to provide each of said respective gears and said first common gear, said assemblies providing different gear ratios.

17. A transmission comprising a main section which includes an input shaft, a main shaft, an intermediate shaft, gears on each of said shafts, said gears on said intermediate shaft being constantly meshed with respective gears on said input shaft and said main shaft, and clutch means for selectively clutching said input shaft gears to said main shaft to provide selected different drive ratios from said input shaft to said main shaft; a range section which includes an input shaft driven by the main shaft of said main section, an output shaft, an intermediate shaft, gears on each of said shafts of said range section, said range section intermediate shaft gears being respectively constantly meshed with said range section input and output shaft gears, and clutch means for selectively coupling said range section input shaft to said range section output shaft either directly or via said range section gears; and reverse means comprising reverse gear means in constant mesh with a gear of said range section and reverse clutch means for clutching said reverse gear means to said main section counter shaft to provide reverse drive to said output shaft.

18. A transmission according to claim 17, wherein said reverse gear means comprises a single gear in constant mesh with said range section intermediate shaft gear.

19. A transmission according to claim 18, including a plurality of said intermediate shafts in each of said sections, and a corresponding plurality of said single reverse gears and of said reverse clutch means for clutching said single gears to respective ones of said intermediate shafts.

* * * * *